Sept. 1, 1964 L. A. BUSBY 3,147,386
NOISE-IMMUNE FILTER
Filed Feb. 27, 1961 2 Sheets-Sheet 1

INVENTOR.
LAWRENCE A. BUSBY
BY Alden D. Redfield
Irwin P. Garfinkle
ATTORNEYS.

Sept. 1, 1964 L. A. BUSBY 3,147,386

NOISE-IMMUNE FILTER

Filed Feb. 27, 1961 2 Sheets-Sheet 2

*INVENTOR.*
LAWRENCE A. BUSBY
BY
ATTORNEYS.

United States Patent Office 3,147,386

Patented Sept. 1, 1964

3,147,386

NOISE-IMMUNE FILTER

Lawrence A. Busby, Cincinnati, Ohio, assignor to Avco Corporation, Cincinnati, Ohio, a corporation of Delaware Filed Feb. 27, 1961, Ser. No. 92,054
5 Claims. (Cl. 307—88.5)

This invention relates to a noise-immune band-pass filter which operates as a frequency-amplitude controlled detector, and more particularly to an automatically controlled dual polarity drive wherein noise is gated out by a regulated negative application to a positive drive transistor amplifier. The desired signal is recognized and accepted where its amplitude, as selected by coupled double-tuned transformation, exceeds that of the average noise amplitude by a predetermined amount.

The invention described herein provides simple electronic circuitry which functions effectively as a noise-suppressed signal selector. Semi conductor diodes are driven in polarity opposition from the primary and secondary of a double-tuned coupled circuit, and the current passed through each diode is dependent on the frequency-amplitude characteristics of the primary and secondary. The voltage outputs from the diodes are summed and applied to drive a threshold amplifier to produce a a step frequency response characteristic with high order skirt rejection and impulse noise suppression. Operation is entirely automatic.

It is the primary object of this invention to provide a noise-immune band-pass filter and detector.

Another object of this invention is to provide a gate for the selection and admission of command signals to a functional load.

Another object of this invention is to provide circuitry for energizing a load in response to signals in a predetermined range of frequencies and to provide means for automatic cancellation, dissipation, or rejection of signals outside said range.

Still another object of this invention is to develop opposing pulsating direct currents from a network tuned to a predetermined audio frequency and for using the opposing voltages to gate power to a load in response to signals of said frequency.

For other objects and advantages of this invention, reference should now be made to the following specification and to the accompanying drawing in which:

FIG. 2 is a series of curves demonstrating the operation of this invention; and

Figures 1, 7:
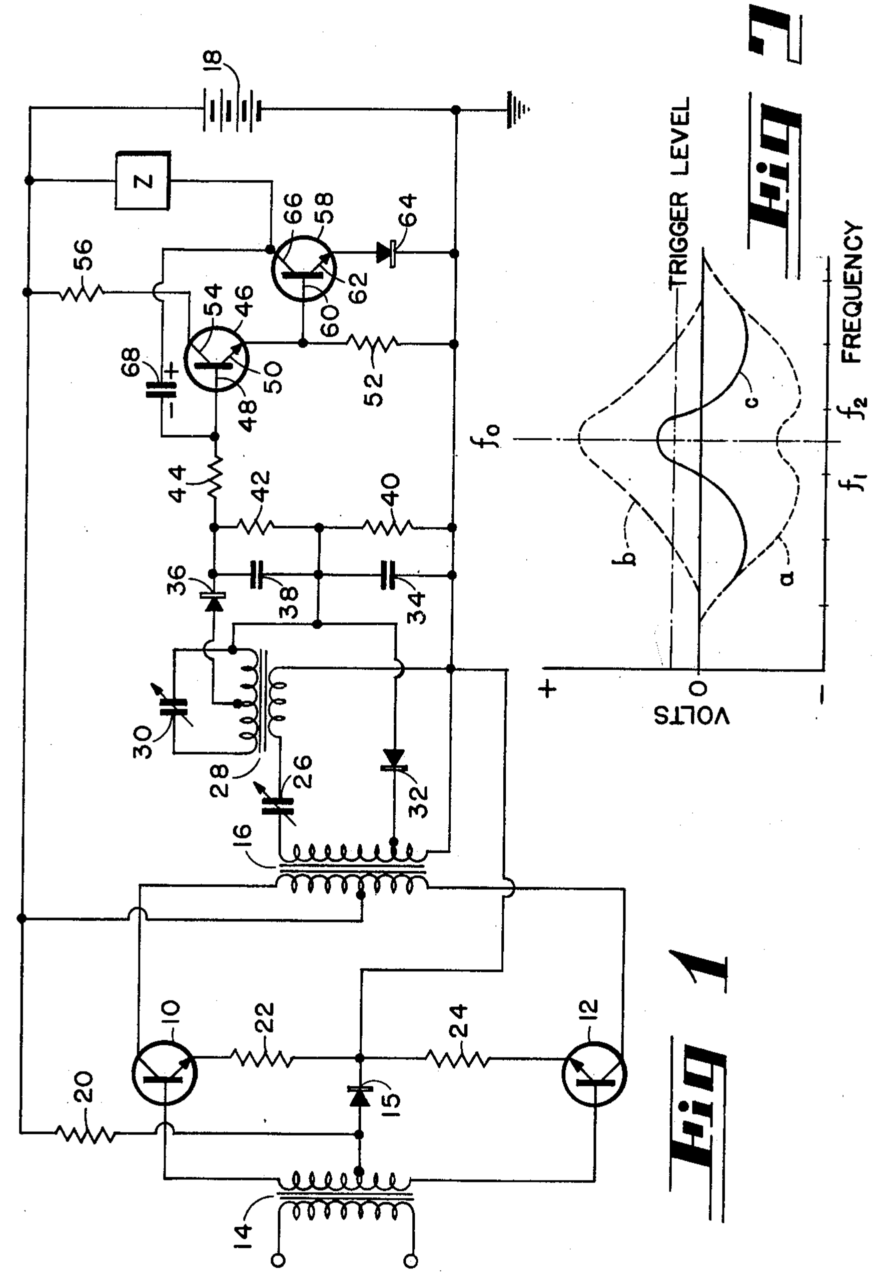
FIG. 1 is a preferred embodiment of this invention.

The apparatus illustrated in FIG. 1 represents the output stages of a command receiver in which it was necessary to energize a relay load in response to signals from a remote station. For example, the apparatus was intended for use as a command receiver on a missile, a relay being energized in response to signals transmitted from a ground station to steer the missile, to destroy it, or to perform any other required function. The practical embodiment shown is a channel operable in the 1 to 20 kc. range. Only one of a number of similar channels is shown since the pertinent action follows the same principle in each. The operating channels are only a few hundred cycles wide at maximum and range to less than a hundred cycles at the low frequency end of the transmission range.

The circuitry illustrated in FIG. 1 comprises a relatively high impedance push-pull, very low frequency amplifier drive including transistors 10 and 12, both driven from the secondary of a transformer 14 and through a diode 15, and having an output applied to the primary of a transformer 16. Base bias for the transistors is supplied from a battery 18 through a resistor 20, while collector-emitter bias for each transistor is provided from the battery 18 through the primary winding of transformer 16 and the resistors 22 and 24 respectively.

The output from the push-pull amplifier drives a double-tuned inductively coupled filter and rectifying network which includes the secondary winding of transformer 16 which is tuned by a capacitor 26 and a transformer 28 tuned by capacitor 30. A portion of the output voltage developed across the secondary of transformer 16 is rectified by means of a diode 32 and applied across a capacitor 34 in shunt with resistor 40. Similarly, a portion of the output voltage inductively coupled to and developed across the secondary of transformer 28 is rectified by means of diode 36 and applied across capacitor 38 and shunt resistor 42 in phase opposition of the voltage applied to capacitor 34. The voltages on the capacitors 34 and 38 are summed in a D.C. sense across the resistors 40 and 42. The summed rectified output voltage resulting across the resistors 40 and 42 is applied to the base-emitter input of a two-stage threshold amplifier through a resistor 44.

The threshold amplifier includes a transistor 46 having a base 48 connected to the resistor 44, an emitter 50 connected to ground through a resistor 52, and a collector 54 connected to the battery 18 through a resistor 56. The emitter-follower output of transistor 46 is applied to the transistor 58 at its base 60. The emitter 62 of transistor 58 is connected to ground through a diode 64, while the collector 66 is connected to the battery 18 through a load Z which, as reduced to practice, comprised the windings of a relay switch. A connection is established from the collector 66 of transistor 58 to the base 48 of transistor 46 through a capacitor 68.

In operation, signals applied to the transformer 14 are amplified by transistors 10 and 12 and impressed across the primary of transformer 16. This input may include desired signal and noise components which are inductively coupled to the double-tuned filter circuit, the primary of which includes the tuned transformer 16, and the secondary of which includes the tuned transformer 28. Curve *"a"* of FIG. 2 demonstrates the response characteristic of the primary network. The response characteristic from the output of the secondary circuit is narrower as shown by curve *"b."*

A portion of the voltage developed across the tuned transformer 16 is rectified by means of the diode 32 and applied to the input of transistor 46 in a polarity sense to cut off its amplifying action. The percentage of the total voltage as determined by design for proper amplifier action and noise immunization is governed by the tap position on the secondary of transformer 16, and this may be in the order of 12–15% for the circuit shown. A portion of the voltage developed across the secondary of the tuned transformer 28, i.e., 20 to 25%, is rectified by means of a diode 36 to generate a positive polarity direct current voltage which is used to charge the capacitor 38. By selecting the proper orders of magnitude for each of these voltages, the algebraic addition of the voltage charges across capacitors 34 and 38 provide a frequency versus amplitude response which is more selective in frequency than either curve *"a"* or *"b."* That is, a negative bandwidth-amplitude area is established on the skirts of the selectivity characteristic as opposed to a positive power transfer in the immediate tuned frequency region. The resultant initial input to the threshold amplifier is dependent upon the relative amplitude drives of primary and secondary rectifier elements in polarity opposition, and the resultant signal pass band exhibits a fairly steep slope factor in the positive region, as illustrated in curve *"c"* where the selectivity or pass-band characteristic is materially enhanced.

It will be noted that any noise occurring outside of the frequency range between $f1$ and $f2$ will result in the production of a negative-going voltage. Since the transistor 46 is an NPN-type transistor, noise in this rectified sense will tend to maintain this transistor in a condition of a total cutoff, and the greater the magnitude of the noise, the larger will be the negative voltage and the more securely will the threshold amplifier be locked against signal amplification.

As the frequency of the signals enters the range between $f1$ and $f2$, an increase in positive potential will result, and when this positive potential exceeds the threshold level of the transistor amplifiers 46 and 58, conduction through each of them will result.

Note that the amplifier threshold or trigger level is a summation of the voltages from the base to emitter of transistor 46, the base to emitter of transistor 58, and across the diode 64. While the impedance of diode 64 is used in establishing the threshold level, it has minimum current limting effects on the current flowing through the relay load Z once conduction results.

When the increased positive potential at the base 48 exceeds the threshold level, some conduction through the collector emitter junction of transistor 46 and through the resistor 52 results, thereby elevating the voltage at base 60 of transistor 58, and causing the transistor 58 to start conducting. When transistor 58 starts to conduct, but before the relay load Z is energized, it will be noted that the condenser 68 is effectively connected from the base 48 of transistor 46 to ground. It will be noted that the effective capacitance of condenser 68 will be multiplied by the voltage gain of transistor 58, and this has the effect of inserting a time delay network into the amplifier circuit. Thus if short-term noise within the frequency range $f1$ to $f2$ produces a voltage sufficient to start conduction through transistor 58, a time delay is automatically inserted into the system to prevent transistor 58 from conducting to the extent necessary to sufficiently energize the relay load Z. On the other hand, desired signals will have a sufficient duration to overcome the time delay and energize the relay. When conduction through transistor 58 and through the relay load Z is increased beyond a predetermined level, the relay load Z is energized to perform its required function.

Thus we have produced a filter circuit which is highly selective; which has automatic receiver quieting in the absence of transmitter intelligence above a preset threshold level; which is signal dependent and amplitude-time discriminating; and which is completely automatic.

While the circuitry shown is designed to eliminate noise present outside of a predetermined frequency range, it will be recognized that the same circuit can be effectively used for the purpose of establishing maximum attenuation of signals on adjacent channels, and this aspect may be even more valuable than noise immunity in some applications. This result can be accomplished by centering the negative peaks of the response curve "*a*" on the channels to be suppressed, and this may be done by controlling the Q and the effective coupling between the primary and secondary circuits. Some staggered tuning may be used to advantage to provide particular shapes of filter attenuation for given applications.

As thus far described, operation may be considered as a frequency-sensitive coupling-dependent double-polarity detector-discriminator with its summed outputs controlling a level-polarity sensitive power amplifier, but the system may be considered as a frequency-amplitude controlled detector. The normal double-tuned amplifier wherein coupled circuits are tuned to the same frequency is subject to loading both on the primary and secondary sides. And in practice both the primary and secondary are fixed loaded in that they couple constant impedance devices, e.g., high impedance tubes. The present invention resorts to a relatively constant impedance drive into the primary but allows variable tank circuit loading by virtue of the semiconductor diode characteristic used as detector rectifier. The secondary circuit loading is subject to similar conditions and the resultant summation is further controlled on an instantaneous basis by the variable loading of transistor 46. The dynamic action of this novel system controlled directly by the input drive power, augments the average conditions and extends the desirable performance of this simple filter. It improves the system efficiency and the attenuation characteristic to provide effectively a "step" type band pass selector with signal quenching over the usual pass band skirt area.

As an aid in reconstructing this invention, the circuit parameters used in an embodiment actually reduced to practice are as follows:

| | |
|---|---|
| Battery **18** | 15.6 volts D.C. |
| Transistor **10** | Type 2N336A. |
| Transistor **12** | Type 2N336A. |
| Transistor **46** | 2N335A. |
| Transistor **58** | 2N657. |
| Diode **15** | 1N457. |
| Diode **32** | 1N645. |
| Diode **36** | 1N645. |
| Diode **64** | SG22. |
| Resistor **20** | 100 k ohms. |
| Resistor **22** | 10 ohms. |
| Resistor **24** | 10 ohms. |
| Resistor **40** | 5.6 k ohms. |
| Resistor **42** | 6.8 k ohms. |
| Resistor **44** | 1.2 k ohms. |
| Resistor **52** | 22 k ohms. |
| Resistor **56** | 2.7 k ohms. |
| Capacitor **34** | 1 $\mu$f. |
| Capacitor **38** | 1 $\mu$f. |
| Capacitor **68** | 47 $\mu$f. |

Figure 3:
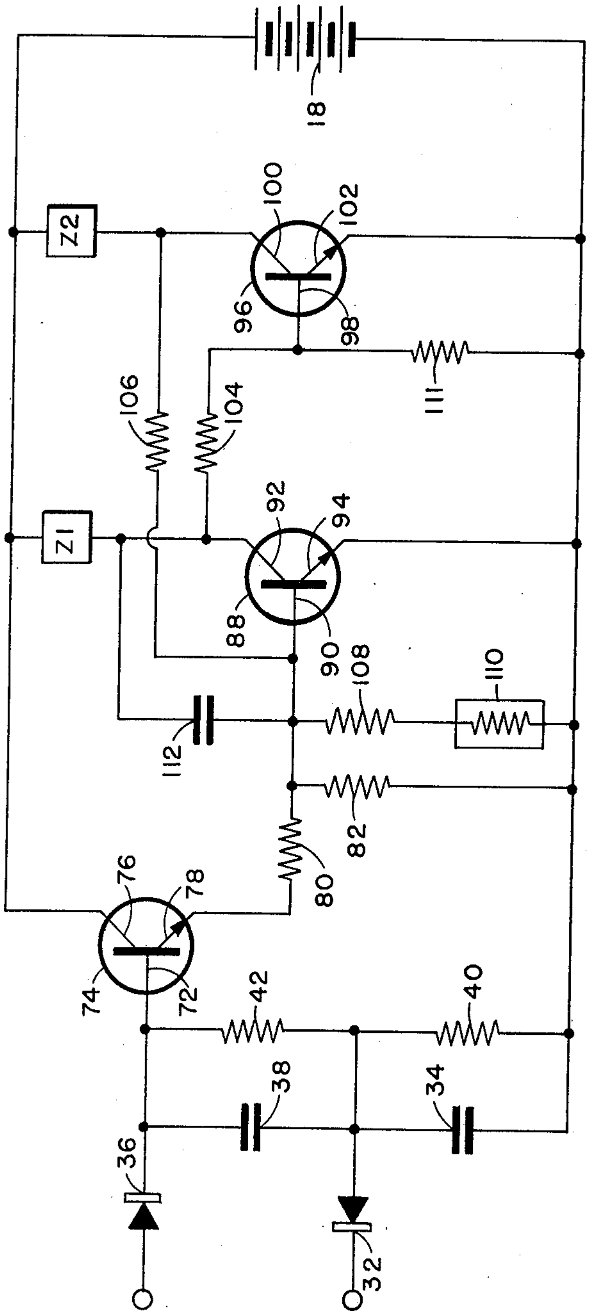
FIG. 3 is another preferred embodiment of this invention.

In the second preferred embodiment of this invention illustrated in FIG. 3, the summed outputs from the diodes 36 and 32 are applied to a flip-flop gate through an additional stage of amplification. This embodiment has the advantage that when operating at the threshold level, random noise will be ineffective to stop operation. That is to say, in the embodiment of FIG. 1, it is possible that at the threshold or trigger level random noise in a negative direction could cut off the transistors 46 and 58 and thereby de-energize the relay load Z. Magnetic-latch relays were used to solve this problem in the embodiment of FIG. 1. In the embodiment of FIG. 3, however, I use the natural hysteresis of the flip-flop to overcome this possibility of relay de-energization.

Referring to FIG. 3, the voltage developed across the resistors 40 and 42 are applied to the base 72 of a transistor 74, the collector 76 of which is connected to one end of the battery 18 while the emitter 78 is connected to ground through resistors 80 and 82. The emitter follower output of the transistor 74 is then applied to the input of a conventional flip-flop circuit. It is to be understood that the transistor 74 is required for the purpose of presenting a higher impedance to the filter network but may be omitted in many applications of the invention.

The transistor flip-flop circuit includes a transistor 88 having a base 90, a collector 92, and an emitter 94, and a transistor 96 having a base 98 and a collector 100 and an emitter 102. The collector 92 of transistor 88 is connected to the base 98 of transistor 96 through a resistor 104, while the collector 100 of transistor 96 is connected to the base 90 of transistor 88 through a resistor 106. Base bias for transistor 88 is provided by means of a resistor 108 and a temperature-compensating thermistor 110 as well as resistors 82 and 80 and transistor 74 as determined by the filter network output. Base bias for the base 98 of transistor 96 is provided by means of a resistor 111, 104 and Z1.

A relay load Z1 is connected in series with the collector and emitter junction of transistor 88 and the battery 18, while a second (optional) relay load Z2 is connected in series with the collector-emitter junction of transistor 96 and the battery 18. A condenser 112 is connected from the collector 92 to the base 90 of transistor 88.

In operation below the threshold level, the voltage at the base of transistor 88 is negative or zero, and transistor 88 is cut off while transistor 96 is conducting at saturation. Under these conditions condenser 112 has little or no effect on any noise appearing at the base of transistor 88.

When the voltage at the base of transistor 88 rises such that transistor 88 starts to conduct and as the flip-flop threshold level is exceeded, the usual regenerative action causes transistor 88 to saturate and transistor 96 to cut off. With transistor 88 saturated and transistor 96 cut off, the load Z1 is switched on while the load Z2 is switched off. It will be noted that when transistor 88 begins to conduct, since capacitor 112 is connected to a relatively low impedance source at the collector of transistor 88, it is effectively connected across the resistor 82, and any short-term noise appearing at the base of transistor 88 is delayed and will be reduced.

When operating just at the threshold level, any noise which appears at the base of transistor 88 just prior to conduction tends to improve the threshold sensitivity. That is to say, with a relatively weak desired signal, added noise could cause conduction of transistor 88 and produce the flip-flop action. On the other hand, once conduction has begun, the hysteresis in the flip-flop action due to the impedance variation from the turn-on to the turn-off state, and other factors known to the art, is such that turn-off occurs at a considerably lower input level than that required for turn-on. Thus once transistor 88 conducts, a low noise level will not be sufficient to cause cut-off and this condition is enhanced because of the time delay effected by the insertion of capacitor 112 into the input circuit of transistor 88. The result is a positive acting switch that is not randomly actuated regardless of noise level.

As an aid to persons skilled in the art in reproducing the embodiment illustrated in FIG. 3, the parameters used in reducing that embodiment to practice are indicated below:

| | |
|---|---|
| Transistor **74** | Type 2N336A. |
| Transistor **88** | Type 2N336A. |
| Transistor **96** | Type 2N336A. |
| Thermistor **110** | Type 41D2. |
| Resistor **80** | 6.8 k ohms. |
| Resistor **82** | 5.6 k. ohms. |
| Resistor **104** | 82 k. ohms. |
| Resistor **106** | 100 k. ohms. |
| Resistor **108** | 3.9 k ohms. |
| Resistor **111** | 27 k. ohms. |
| Capacitor **112** | 1 μf. |

While specific embodiments have been illustrated, it will be understood that many modifications and adaptations will be available within the scope and spirit of the invention. For example, double-tuned circuitry is not required and two direct voltages having the necessary characteristics may just as readily be produced from two isolated tuned circuits. It is my intention, therefore, that this invention be limited only by the scope of the appended claims as interpreted in the light of the prior art.

What is claimed is:

1. In a system for energizing a load in response to signals within a predetermined range of frequencies, the combination comprising: a double-tuned circuit tuned to said range of frequencies, said circuit including a first transformer and a second transformer, each having primary and secondary windings, the primary winding of said second transformer being coupled to the secondary winding of said first transformer, said secondary winding of said first transformer and said secondary winding of said second transformer each being tuned to said range of frequencies, whereby the output from said secondary winding of said second transformer has a frequency response which is relatively narrow with respect to the output from the secondary winding of said first transformer; a load; a source of power for energizing said load; a gate for connecting said source to said load; said gate including a first transistor having a base, an emitter, and a collector; a resistor connected to said emitter; a rectifier connected from a point on said secondary winding of said first transformer to said base; an oppositely phased rectifier connected from a point on said secondary winding of said second transformer to said base; the collector and emitter electrodes of said first transistor and said resistor being connected in series across said source, said first transistor having characteristics such that it is rendered conductive when the voltage developed by currents flowing through said second rectifier into said base exceeds the voltage developed by currents flowing through said first rectifier into said base by a predetermined amount; a second transistor having a base, an emitter, and a collector, said base and emitter being connected across said resistor, said source and said load being connected in series with said collector and said emitter, said second transistor being conductive when the voltage across said resistor exceeds a predetermined amount.

2. The invention as defined in claim 1 and a capacitor connected between the base of said first transistor and the collector of said second transistor, whereby conduction of said second transistor effectively connects said capacitor across said base and emitter of said first transistor to automatically insert a time delay in said circuit.

3. The invention as defined in claim 2, and a diode rectifier connected to the emitter of said second transistor for establishing a threshold for said gate.

4. In a system for energizing a load in response to signals within a predetermined range of frequencies, the combination comprising: a filter circuit tuned to pass said range of frequencies, said filter circuit including a primary network and a secondary network, said primary and said secondary networks each being tuned to the same range of frequencies, said second network having a substantially narrower frequency response characteristic than said primary network; a first diode rectifier and a first condenser connected in series with a portion of said primary network, said first diode being phased to produce a first direct voltage of one polarity; a second diode rectifier and a second condenser connected in series with a portion of said secondary network, said second diode being phased to produce a second direct voltage of the opposite polarity, said first and second condensers being connected in series to produce a voltage which is a summation of said first and second voltages; first and second resistors connected across said first and second condensers respectively; a load; a source of power for energizing said load; a gate for connecting said source to said load, said gate comprising first and second transistors each having base, emitter, and collector electrodes, a two-terminal direct current source, an emitter-resistor connected to the emitter of said first transistor, said emitter-resistor and said collector of said first transistor being connected in series across said two-terminal source, said summed voltages being applied between the base of said first transistor and said emitter-resistor, the base and emitter electrodes of said second transistor being connected across said emitter-resistor, said load being connected in series with the collector and emitter electrodes of said second transistor across said two-terminal source; and a condenser connected between the collector of said second transistor and the base of said first transistor.

5. In a system for energizing a load in response to signals within a predetermined range of frequencies, the combination comprising: a double-tuned circuit tuned to said range of frequencies, said circuit including a first transformer and a second transformer, each having primary and secondary windings, the primary winding of said second transformer being coupled to the secondary winding of said first transformer, said secondary winding of said first transformer and said secondary winding of said second transformer each being tuned by a parallel connected capacitor to said range of frequencies, whereby the output from said secondary winding of said second transformer has a frequency response which is relatively narrow with respect to the output from the secondary winding of said first transformer; a load; a source of power for energizing said load; a gate for connecting said source to said load; said gate including a transistor having a base, an emitter, and a collector; a resistor; a first semiconductor rectifier connected from a point on said secondary winding of said first transformer to said base; a second oppositely phased semiconductor rectifier connected from a point on said secondary winding of said second transformer to said base; the collector and emitter electrodes of said transistor and said resistor being connected in series across said source, said transistor having characteristics such that it changes state when the voltage developed by currents flowing through said second semiconductor rectifier into said base exceeds the voltage developed by currents flowing through said first semiconductor rectifier into said base by a predetermined amount; and means responsive to the change of state of said transistor for connecting said source across said load.

References Cited in the file of this patent

UNITED STATES PATENTS

| | | |
|---|---|---|
| 2,809,339 | Guggi | Oct. 8, 1957 |
| 2,903,603 | Glenn | Sept. 8, 1959 |
| 2,905,816 | Buebel | Sept. 22, 1959 |
| 2,926,241 | Goldman | Feb. 23, 1960 |
| 3,011,052 | Busby | Nov. 28, 1961 |
| 3,075,151 | Murray | Jan. 22, 1963 |

FOREIGN PATENTS

| | | |
|---|---|---|
| 534,341 | Canada | Dec. 11, 1956 |